United States Patent [19]
Cooper

[11] 3,808,899
[45] May 7, 1974

[54] TRANSMISSION UNIT

[76] Inventor: Edward Frank Cooper, 2 Penning Rd., Milford, Auckland, New Zealand

[22] Filed: Sept. 13, 1972

[21] Appl. No.: 288,710

[30] Foreign Application Priority Data
Sept. 17, 1971 New Zealand.................. 164897

[52] U.S. Cl. ............................................ 74/203
[51] Int. Cl. ........................................ F16h 15/00
[58] Field of Search ........................... 74/203, 404

[56] References Cited
UNITED STATES PATENTS

| 783,037 | 2/1905 | Herby | 74/203 X |
|---|---|---|---|
| 2,654,260 | 10/1953 | Lewis | 74/203 |
| 2,912,871 | 11/1959 | Velkoff | 74/203 |

FOREIGN PATENTS OR APPLICATIONS

| 590,031 | 1/1960 | Canada | 74/203 |
|---|---|---|---|
| 511,536 | 4/1955 | Canada | 74/203 |
| 824,932 | 12/1959 | Great Britain | 74/203 |

Primary Examiner—Leonard H. Gerin
Attorney, Agent, or Firm—Mann, Brown, McWilliams & Bradway

[57] ABSTRACT

This invention relates to a transmission unit comprising at least two substantially parallel shafts at least one of which is adjustably mounted so as to enable the spacing between the shafts to be varied, at least one continuous belt being provided and being operable about pulleys attached to the shafts; each of the shafts mounted at least one drive wheel, movable guard members being positioned substantially laterally of the belt, at least one of the parallel shafts being a driving shaft and being adapted to have power imparted thereto from a prime mover, at least one other shaft being a driven shaft, the unit being characterized in that the belt and pulleys provide a forward drive from the driving shaft to the driven shaft, a lessening of the spacing between the shafts causing the drive wheels to contact and to thus provide a reverse drive, at least the adjustably mounted shaft enabling a neutral condition in which the shafts are disconnected one from the other, the guard members being provided around the periphery of the drive belt so that the belt may be restrained or held free during the use of reverse or neutral drive.

3 Claims, 6 Drawing Figures

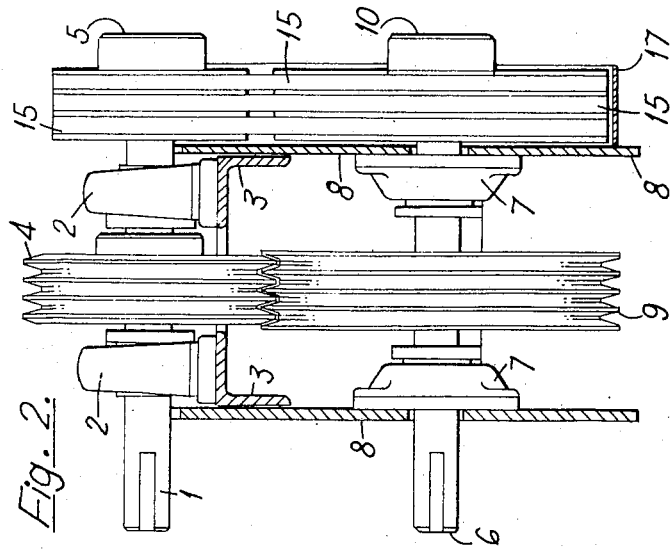
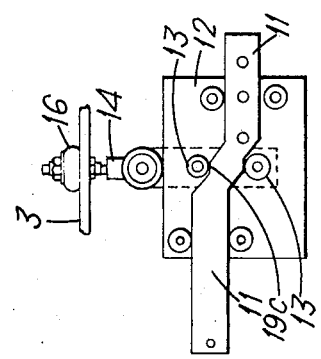
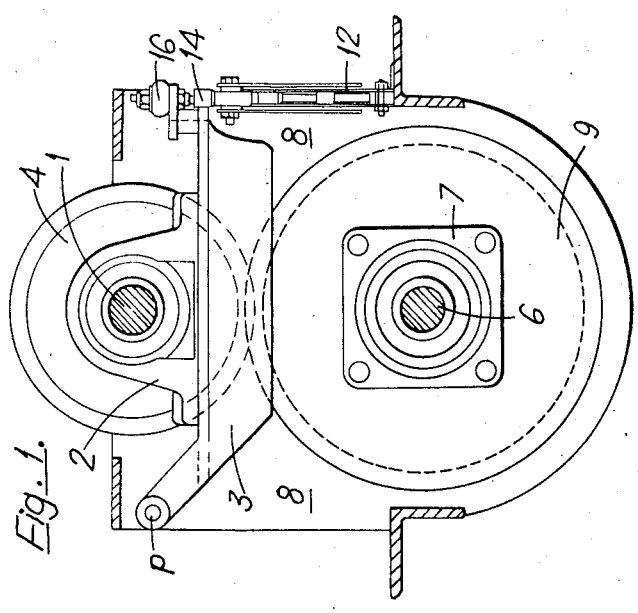

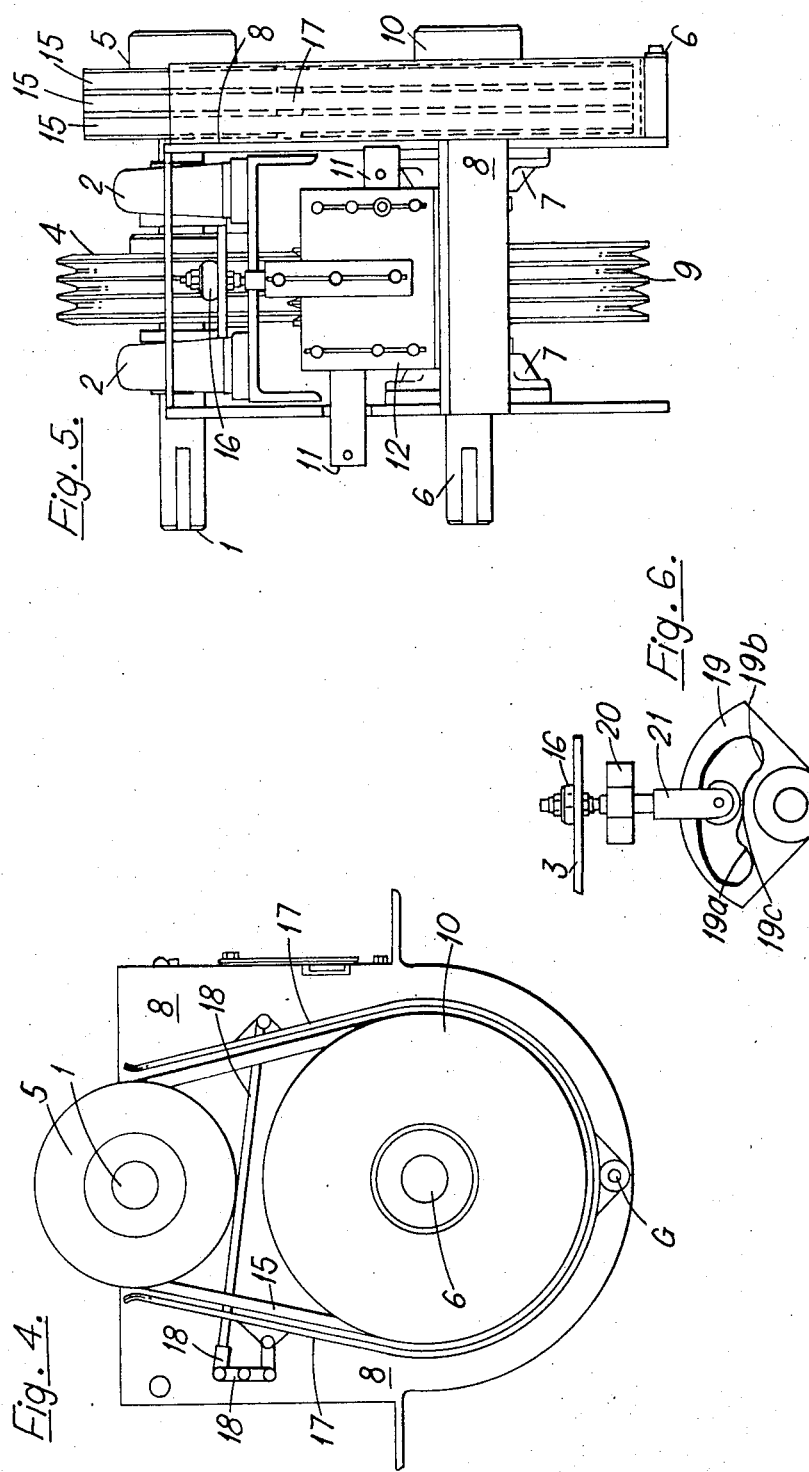

TRANSMISSION UNIT

This invention relates to transmission units for controlling the directional or neutral output of a prime mover and is more particularly concerned, although not exclusively, with a transmission unit which is suitable for utilization with small marine vessels.

It is an object of this invention to provide a transmission unit that is straightforward in construction and efficient in operation.

It is a further object of this invention to provide a transmission unit which provides reliability for sustained periods of both forward and reverse operation.

According to one aspect of this invention there is provided a transmission unit comprising at least two substantially parallel shafts at least one of which is adjustably mounted so as to enable the spacing between the shafts to be varied, at least one continuous belt being provided and being operable about pulleys attached to the shafts, at least one drive wheel being affixed to each shaft; movable guard members being positioned substantially laterally of the belt, at least one of the parallel shafts being a driving shaft and being adapted to have power imparted thereto from a prime mover, at least one other shaft being a driven shaft, and unit being characterized in that the belt and pulleys provide a forward drive from the driving shaft to the driven shaft, a lessening of the spacing between the shafts causing the drive wheels to contact and to thus provide a reverse drive, at least the adjustably mounted shaft enabling a neutral condition in which the shafts are disconnected one from the other, the guard members being provided around the periphery of the drive belt so that the belt may be restrained or held free during the use of reverse or neutral drive.

As aforesaid the invention relates to a means for the transmission of power from a source of power or prime mover, such as for example a marine engine, to enable the forward and reverse propulsion of a vessel without the usual requirement for the use of a train of gears or the need for the reversing of the direction of rotation of the prime mover. Further, the invention provides a neutral condition between forward and reverse drive, in which neutral condition the input and output shafts are freely disconnected from each other.

Notwithstanding the reference to the preferred application of the invention to marine transmission of power it will be appreciated that the invention has equal application to those circumstances in which a one-directional power source may be required.

In the preferred form of the invention a transmission unit is provided that is suitable for a small vessel. A framework is provided to support the components of the transmission unit enabling same to be positioned as required preferably on rigid mountings directly to the vessel.

Two shafts are rotatably mounted in the framework, the shafts being mounted parallel and in alignment with one another preferably with one above the other. One shaft, preferably the upper shaft, is suitably connected to the output shaft of the prime mover and the remaining shaft is arranged to provide the output drive from the transmission unit.

Each shaft has fixed pulleys mounted thereon about which a continuous belt operates to provide forward drive. Preferably the pulleys are arranged one above the other and preferably the belt is of the "V" type, the inherent resiliency thereof tending to maintain same in a substantially circular formation when not under tension such as when same is operating. Depending on the horse power to be transmitted more than one belt and associated pulleys may be provided.

Each shaft is also provided with one or more drive wheels arranged one above the other such that upon their peripheries contacting a frictional reverse drive is provided.

One of the shafts, preferably the upper shaft, is adjustably mounted enabling the spacing between the two shafts to be altered. Maximum spacing provides that the belt is suitably tensioned to provide forward drive and minimum spacing provides that the drive wheels contact to provide a frictional reverse drive. Preferably the spacing is such that a positive neutral position is provided therebetween, that is with the belt clear of the pulleys and not operating thereabout and the drive wheels not being in contact.

The arrangement enables variations between pulleys and forward drive wheels to be readily achieved thus providing for inexpensive conversion if required.

A guard to retaining means is provided adjacent to the belt or belts providing the forward drive. When the upper shaft is moved adjacent to the lower shaft and thus the tension from the belt removed, the belt will drop clear of the lower pulley and tend to form a circular formation. The guards are arranged to prevent the belt forming a circular formation and to retain same substantially in the formation under which same operates. Preferably laterally positioned guards are provided, one to each side of the belt, each guard extending upwardly in alignment with the path of the belt but spaced outwardly therefrom. By this arrangement, upon the tensioning being removed from the belt that portion about the lower pulley will drop clear, and the lateral portions will tend to move outwardly until contacting the guard which will prevent further outward movement thus retaining the upper portion of the belt in an arcuate formation clear of the upper pulley.

The invention will now be described by way of example only with reference to the accompanying drawings in which:

FIG. 1: is a cross-sectional end view of the transmission unit,

FIG. 2: is a cross-sectional elevation of the unit,

FIG. 3: is an elevational view of one embodiment of the control mechanism of the unit, FIG. 4: is an end view of one embodiment of the unit, FIG. 5: is a side view of the unit, FIG. 6: is a further elevation of a second embodiment of the control mechanism of the unit.

Referring to the accompanying drawings, the invention preferably consists of a multiple vee drive for forward and ahead drive and a multiple vee friction drive for reverse or astern drive. Movable guard members are also provided around the periphery of the driving belts, by means of which guard members belts are restrained or held free from the driving pulleys during the use of the neutral or reverse drive condition. The unit is preferably mounted within and about a compact framework which also incorporates a positive system of controlling the direction of rotation of the output or driven shaft, and which may be operated by a directly attached lever or by remote controls such as may be operated, in the case of a marine vessel, from a vessel's bridge or wheelhouse.

A main frame or housing 8 (FIGS. 1 and 2) supports two shafts 1 and 6, the shaft 1 being the input or driving shaft which may be linked to, for rotation by, a suitable prime mover and the like (not shown), and the shaft 6 being the output or driven shaft, the shafts being suitably and rotatably mounted in bearings such as 2 and 7. The bearings 2 in which the shaft 1 rotates are preferably mounted on a sub-frame or arm 3 which is pivotally attached to the main frame 8 at point "P" which means, while both shafts 1 and 6 are constantly maintained substantially parallel to each other, the distance therebetween may be varied in a controlled manner, by suitable control means. In this form of the invention the control mechanism may be in the form of a sliding cam mechanism 12 (see FIG. 3) or a rotatable cam or eccentric mechanism (FIG. 6). Reference to FIG. 3 will show that by moving sliding cam 11 from right to left, the linkage 14 will be raised or extended, thereby moving the sub-frame member 3, and shaft 1 away from shaft 6. Similarly, by the use of the alternate mechanism illustrated in FIG. 6, the rotation of cam or eccentric 19, preferably in a substantially clockwise direction until the lobe 19a thrusts cam follower 21 upwards through guide 20, also causing raising or extending movement, and since cam follower 19 is in this case connected to sub-frame 3, the movement of shaft 1 away from shaft 6 would also be achieved by this means.

By using either means the movement of shaft 1 away from shaft 6 increases the distance separating the multiple vee pulleys 5 and 10 which are preferably affixed to shafts 1 and 6 respectively at either or both extremities, outside their supporting bearings, and by so doing imparts a driving tension to the driving belt or belts 15 (FIGS. 2, 4 and 5) with the result that rotational movement imparted by a power source or prime mover to the input shaft 1 is transmitted to output shaft 6 which will thereby be caused to rotate in the same direction as shaft 1.

Simultaneously with the extending or outward movement of sub-frame 3, by a mechanical linkage 18 such as that illustrated in FIG. 4, the restraining belt guard members 17 are caused to move outwardly about their pivotal point indicated by "G" (FIGS. 4 and 5) and so away from the driving belts 15 to a position where they do not restrain the belts or in any way interfere with or impede the freedom of movement or vibration which is known to occur during varying driving stresses.

Referring now to the movement of the control mechanism (FIGS. 3 and 6) in the opposite direction. Movement of sliding cam 11 (FIG. 3) to the left or rotation of cam or eccentric 19 (FIG. 6) towards the position indicated by 19b will cause an inward or closing movement to be applied to sub-frame 3 and this will result in the two shafts 1 and 6 coming into closer proximity with each other. At the same time, an inward movement of sub-frame 3, through the linkage 18 shown in FIG. 4, will cause an inward or closing movement of the guard members 17, to a point where they will restrain the driving belt 15 from following the inward or closing movement of the pulleys 5 and 10, as the natural resilience of the belts would otherwise permit; the result would normally be that the belts would be freed from their driving contact with the pulleys and would thus no longer connect the two shafts 1 and 6. The shaft 1 will, however, continue to rotate at the speed and direction imparted to it from the prime mover and the shaft 6 is freed from any driving force since the belts, with tension now relaxed, are held clear of the pulley by the guard members 17, which are located about their pivot "G" in such a manner and position that upon removal of the driving tension, the belts fall clear of the pulley 10 and in particular the grooves of the pulley, and are thus held in this removed position by the guard members 17.

If inward or closing movement of the sub-frame member 3 is continued, the input shaft 1 will cause the drive wheels or sheaves 4 and 9 to be brought into contact with each other. Preferably the drive wheels or sheaves 4 and 9, which are preferably multiple sheaves are suitably affixed to shafts 1 and 6 respectively. Following the continued inward movement and the contact of the drive wheels or sheaves maybe followed by a final movement of either of the control mechanisms shown in FIGS. 3 and 6 and this final movement will cause a suitable friction drive pressure block 16, such as a rubber block, to be compressed and to thereby exert a firm but resilient pressure at the points of contact between the drive wheels or sheaves 4 and 9, with the result that the peripheral movement of the frictional drive sheave 4, and the shaft 1, will be transmitted to the sheave 9 which is thereby caused to rotate in the opposite direction from that in which the input shaft is being driven; this then gives a reverse drive.

Reference to the mechanisms shown in FIGS. 3 and 6 will show that midway or substantially midway between the two extremes of movement of both the cam and the eccentric, there is a position such as indicated by 19c, in which position the inwards and outward or closing and opening movements of sub-frame 3 is arrested and positively retained. In this position the driving belts, having been released from there driving tension, are in a substantially slack state and are held clear of the driving pulleys. The shafts 1 and 6 are firmly held by the control mechanisms be they the mechanisms shown in fifure 3 or the mechanisms shown in FIG. 6. In this position the forward driving belts are clear of the pulleys the drive wheels or sheaves are not in contact with each other.

In this position a complete neutral state is achieved and the prime mover may continue to rotate without exerting any influence, either driving or resisting, upon the output shaft 6 and the output shaft is therefore free to rotate without hinderence.

While the present invention has been described with reference to use as a marine transmission unit, it will be appreciated that the invention is in no way limited to such use, many other equally advantageous applications being envisaged.

I claim:

1. A transmission unit comprising at least two substantially parallel shafts at least one of which is adjustably mounted so as to enable the spacing between the shafts to be varied, at least one continuous belt being provided and being operable about pulleys attached to the shafts, each of the shafts mounting at least one drive wheel, movable guard members being positioned substantially laterally of the belt, at least one of the parallel shafts being a driving shaft and being adapted to have power imparted thereto from a prime mover, at least one other shaft being a driven shaft, the unit being characterized in that the belt and pulleys provide a forward drive from the driving shaft to the driven shaft, a lessening of the spacing between the shafts causing the drive wheels to contact and to thus provide a reverse drive, at least the adjustably mounted shaft enabling a neutral condition in which the shafts are disconnected one from the other, the guard members being provided around the periphery of the drive belt so that the belt may be restrained or held free during the use of reverse or neutral drive, with the parallel shafts being positioned one above the other such that the upper shaft is the driving shaft and the lower shaft is the driven shaft, the driving shaft being mounted on a movable sub-frame so that it is movable relative to the driven shaft, a positive forward drive being imparted to the driven shaft on the driving shaft being moved so that the continuous belt passing around the pulleys is tightened, this imparting drive from the driving shaft to the driven shaft.

2. A transmission unit comprising at least two substantially parallel shafts at least one of which is adjustably mounted so as to enable the spacing between the shafts to be varied, at least one continuous belt being provided and being operable about pulleys attached to the shafts, each of the shafts mounting at least one drive wheel, movable guard members being positioned substantially laterally of the belt, at least one of the parallel shafts being a driving shaft and being adapted to have power imparted thereto from a prime mover, at least one other shaft being a driven shaft, the unit being characterized in that the belt and pulleys provide a forward drive from the driving shaft to the driven shaft, a lessening of the spacing between the shafts causing the drive wheels to contact and to thus provide a reverse drive, at least the adjustably mounted shaft enabling a neutral condition in which the shafts are disconnected one from the other, the guard members being provided around the periphery of the drive belt so that the belt may be restrained or held free during the use of reverse or neutral drive, with the two parallel shafts being one above the other, the driving shaft being located above the driven shaft, the driving shaft being mounted on a movable sub-frame so that it is movable relative to the output shaft, control means being provided to control the movement of the driving shaft relative to the driven shaft; each shaft being provided with at least one driven wheel in the form of a multiple sheave, the arrangement being such that the control means and the movable input shaft enable the sheaves attached to the shafts to be brought into contact, following which contact a movement of the control means causes a frictional drive pressure block associated with the control means be compressed and exert a firm and resilient pressure at the points of contact between the sheaves; thus any peripheral movement of the sheave attached to the driving shaft will be transmitted to the sheave attached to the driven shaft, this causing the driven shaft to rotate in a direction opposite to that in which the driving shaft is rotating, this resulting in a reverse drive being imparted by the driven shaft.

3. A transmission unit comprising at least two substantially parallel shafts at least one of which is adjustably mounted so as to enable the spacing between the shafts to be varied, at least one continuous belt being provided and being operable about pulleys attached to the shafts, each of the shafts mounting at least one drive wheel, movable guard members being positioned substantially laterally of the belt, at least one of the parallel shafts being a driving shaft and being adapted to have power imparted thereto from a prime mover, at least one other shaft being a driven shaft, the unit being characterized in that the belt and pulleys provide a forward drive from the driving shaft to the driven shaft, a lessening of the spacing between the shafts causing the drive wheels to contact and to thus provide a reverse drive, at least the adjustably mounted shaft enabling a neutral condition in which the shafts are disconnected one from the other, the guard members being provided around the periphery of the drive belt so that the belt may be restrained or held free during the use of reverse or neutral drive, the two parallel shafts are provided within the frame work of the unit, the shafts being located one above the other such that the upper shaft is the driving shaft while the lower shaft is the driven shaft, the upper shaft being mounted on a sub-frame which is pivotally attached to the frame work of the unit; said guard members being pivotally attached to the frame work of the unit so as to be positioned about the periphery of the continuous belt, the guard members being attached by a mechanical linkage to the pivotal sub-frame, control means being provided to control movement of the sub-frame and the driving shaft, relative to the driven shaft, the unit being characterized in that when the driving shaft is moved away from the driven shaft so as to tighten the continuous belt about the pulleys and to thereby impart a forward movement to the driven shaft, the mechanical linkage causes the guard members to pivot away from the continuous belt and pulleys so as not to impede or interfer with the operation of the unit; on the driving shaft being moved towards the driven shaft to facilitate a neutral or reverse condition, the belt will loosen and the mechanical linkage between the sub-frame and the guard members will cause the guard members to pivot into a position adjacent the loose belt where the guard members hold the loose belt in a restrained position free of the shafts and pulleys during the neutral and reverse conditions.

* * * * *